Oct. 27, 1964
J. L. GARDNER ETAL
3,154,159
RECORDING BATHROOM SCALE
Filed April 1, 1963
2 Sheets-Sheet 1
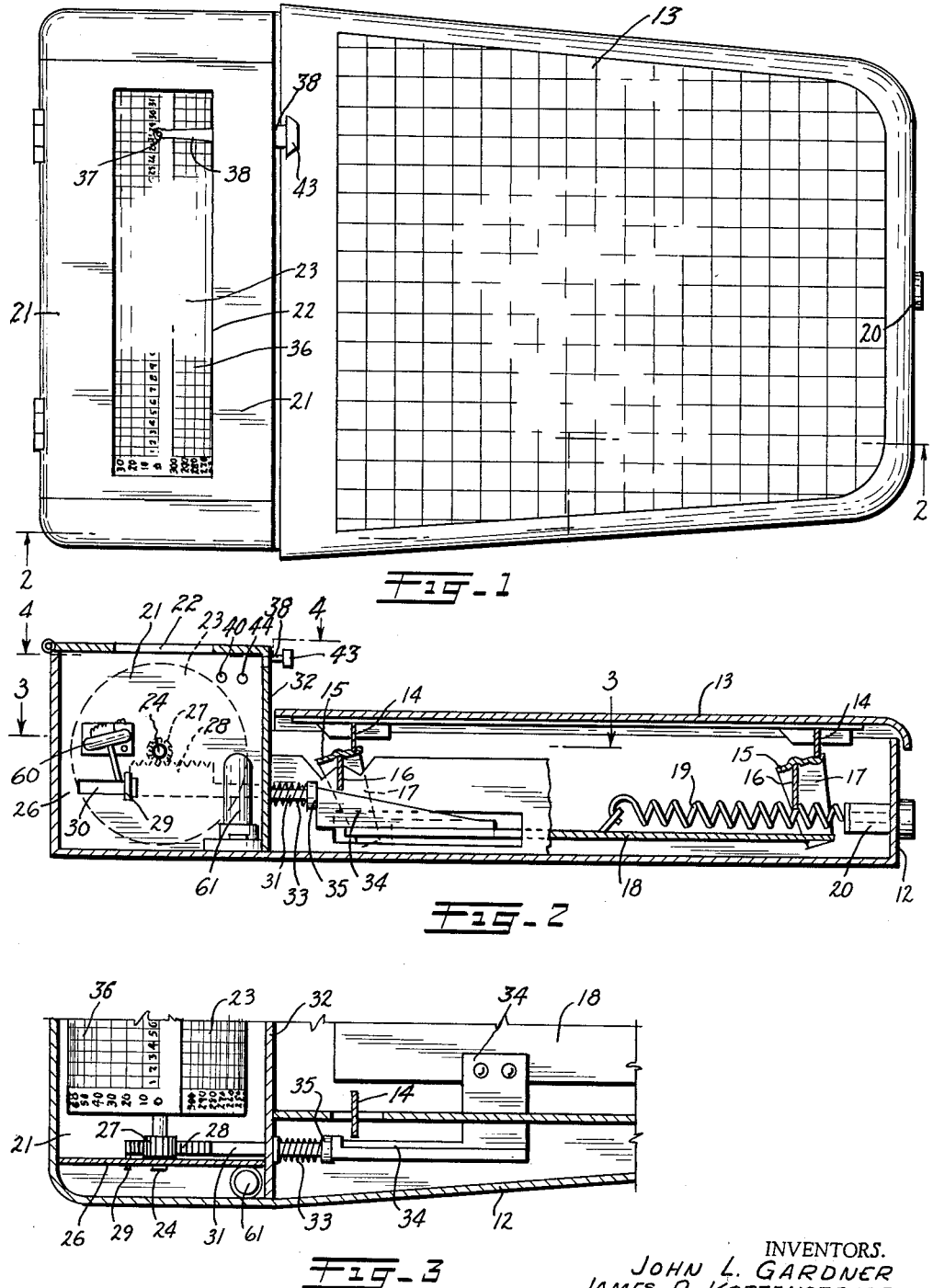
INVENTORS.
JOHN L. GARDNER
JAMES P. KOTTENSTETTE
BY
ATTORNEY

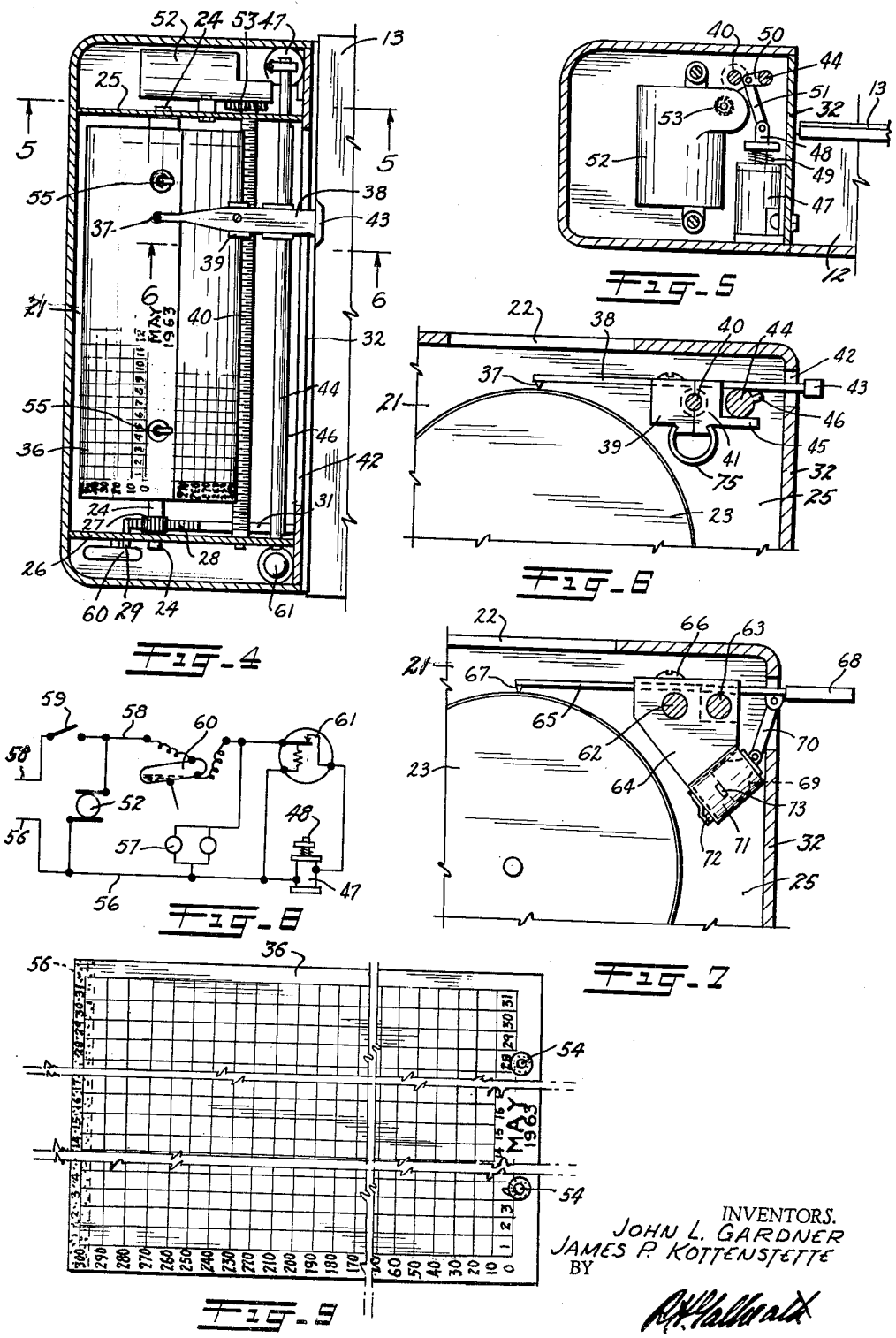

United States Patent Office 3,154,159
Patented Oct. 27, 1964

3,154,159
RECORDING BATHROOM SCALE
John L. Gardner, 2630 S. Dahlia, Denver 22, Colo., and James P. Kottenstette, 1850 Clayton, Denver 10, Colo.
Filed Apr. 1, 1963, Ser. No. 269,513
7 Claims. (Cl. 177—10)

This invention relates to a bathroom scale. It is necessary for a person when dieting or undergoing various treatments to keep a daily record of his weight to determine whether an increase or decrease is taking place. The keeping of accurate records is a rather burdensome task and as a result is often neglected.

The principal object of this invention is to incorporate recording means into the scale which will make and retain a daily record of the weight of an individual over a period of time, such as a month, so that a check can be made at any time to determine whether the weight is increasing or decreasing and the rate of change therein.

Another object is to provide means in a bathroom scale which will automatically record the daily weight without attention on the part of the user.

A further object is to provide a recording bathroom scale which will be economical to manufacture so that it will be sufficiently low in price for general household use and to provide such a scale which will be simple to use and which will be accurate, sturdy and long lasting.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a top plan view of the recording bathroom scale of this invention;

FIG. 2 is a longitudinal section therethrough, taken on the line 2—2, FIG. 1;

FIG. 3 is a fragmentary section looking downwardly on the line 3—3, FIG. 2;

FIG. 4 is a fragmentary section looking downwardly on the line 4—4, FIG. 2;

FIG. 5 is a fragmentary section taken on the line 5—5, FIG. 4;

FIG. 6 is an enlarged detail, fragmentary section taken on the line 6—6, FIG. 4;

FIG. 7 is a similar enlarged detail fragmentary section showing an alternate form of an internal element;

FIG. 8 is a circuit diagram showing the electric circuits employed in the device; and FIG. 9 is an enlarged, fragmentary, detail view illustrating a graph sheet on a chart as used for receiving and retaining a daily record of the weights applied to the scale.

The weighing portion of the improved recording bathroom scale can be any of the conventional constructions. This invention relates more particularly to a recording mechanism for such a scale. One of the conventional weighing portions is indicated on the drawing consisting of an outer housing 12, adapted to rest upon the floor, covered by a depressible treadle plate 13 upon which the user stands. The treadle plate 13 is provided with downwardly extending plate supports 14 which rest eccentrically upon tilting members 15 mounted to tilt upon knife edge supports 16. Lever arms 17 extend downwardly from the tilting member 15 and suspend a shift plate 18 so that weight upon the treadle plate 13 acts to urge the shift plate horizontally forward. The shift plate 18 is constantly urged rearwardly against the weight on the treadle plate by a tension spring 19 connected at its forward extremity to the shift plate 18 and at its rear extremity to a tension-adjusting screw 20 on the housing 12.

The above described structure is conventional in many bathroom scales. This invention makes use of the shift plate 18 to provide a weight recording mechanism for the scale.

The recording mechanism includes a drum compartment 21 extending across the forward extremity of the housing 12 and provided with an elongated window 22 through which a horizontal, elongated, cylindrical recording drum 23 of any suitable construction is visible. The recording drum is mounted on a drum shaft 24 journalled at one extremity in a right end plate 25 and at its other extremity in a left end plate 26. The end plates 25 and 26 are positioned in and close the ends of the drum compartment. The drum compartment is separated from the housing 12 by a rear wall plate 32.

The drum shaft 24 carries a toothed pinion 27, adjacent the left end plate 26, which meshes with a toothed rack 28. The forward extremity of the rack 28 is supported by a slider tab 29 which projects through and slides in a horizontally-elongated guide opening 30 in the left end plate 26. The guide opening 30 acts to limit the travel of the rack 28 to a predetermined stroke. The rear extremity of the rack 28 is supported from a slidable push rod 31 extending horizontally rearward through a suitable guide opening in the rear wall plate 32 and terminating in a push button 35. A compression spring 33 surrounds the push rod 31 and acts against the wall plate 32 to constantly urge the rack 28 rearwardly.

When weight is applied to the treadle plate 13 the rack 28 is forced forwardly to rotate the drum 23 through the medium of a pushing arm 34. The pushing arm 34 is riveted to, or is otherwise mounted on, the shift plate 18 of the scale and terminates in alignment with the push button 35 so that as the shift plate moves forwardly the pushing arm 34 will contact the button 35 to move the rack 28 forwardly against the bias of the spring 33, to rotate the drum 23 rearwardly.

A replaceable chart 36, preferably of pressure sensitive paper, surrounds and is removably attached to the drum in any desired manner. The chart is divided into adjacent circumferentially ruled-columns headed by digits representing the days of the month and with parallel, axially-extending ruled lines representing pounds of weight. As illustrated in FIG. 9, one method of attaching the chart 36 to the drum is similar to that used for attaching mimeograph stencils to a drum, that is, the charts are provided with hook holes 54 which engage hooks 55 on the drum so that a sheet may be hooked to and wrapped around the drum. The bottom of the chart may then be secured by a band of pressure adhesive 56 on the back of the bottom edge of the sheet.

Pressure at any point on the pressure sensitive chart will produce a mark on the chart indicating a certain weight in pounds on a certain day of the month. The indicating marks are produced on the sheet by a pressure point 37 on the forward extremity of a flat, elongated, spring steel pointer blade 38 which is fixedly mounted adjacent its middle on a threaded half-nut 39, the threads of which engage threads on a threaded shaft 40 journalled in and extending between the end plates 25 and 26 parallel to the drum shaft 24.

The threaded half-nut 39 is resiliently maintained in contact with the threads on one side of the threaded shaft 40 by an unthreaded half-nut 41 which is constantly urged against the other side of the shaft 40 by an arcuate clamping spring 75 which resiliently clamps the two half-nuts 39 and 41 together about the shaft 40 to form a carriage member for the pointer blade. The rear extremity of the pointer blade 38 projects rearwardly through an elongated, horizontal slot 42 in the drum compartment and terminates in a resetting button 43. The latter rear extremity rides on and is slidable along a pointer-actuating-rod 44 which is also journalled in the end plates 25 and 26 and extends therebetween parallel to the threaded shaft 40. A rearwardly-projecting shelf 45, formed on the unthreaded half-nut 41, is resiliently urged upwardly against the bottom of the pointer-actuating-rod 44 by the reaction of the pressure of the resilient pointer blade 38 on the latter rod, so that the rod 44 is resiliently clamped between the shelf 45 and the blade 38.

The pointer-actuating-rod 44 is provided with a longitudinally extending, radially-projecting spline 46 which, when the rod 44 is rotated counter-clockwise in FIG. 6, will contact and flex the rear extremity of the pointer blade 38 upwardly. The latter counter-clockwise rotation is applied to the rod 44 through the medium of a solenoid 47 which when energized attracts a plunger 48 downwardly against a compression spring 49. The downward movement of the plunger 48 is communicated into rotative movement of the rod 44 through the medium of a crank 50, mounted on the rod and connected to the plunger by a connecting rod 51.

The threaded shaft is rotated from a reduction geared, clock-type, synchronous motor 52 through the medium of transmission gears 53. The speed of the threaded shaft 40 and the pitch of the threads thereon are preferably such that the pointer 38 will travel the full width of the chart 36 in one month so as to give a full month scan of weight.

The solenoid 47 can be energized from the house lighting circuit or from suitable batteries and the circuit to the solenoid may be closed in any desired manner such as through the medium of a photo-electric beam interrupted by the user.

A satisfactory circuit for the purpose is diagrammed in FIG. 8 in which a ground conductor 74 leads to the motor 52, the solenoid 47 and to suitable electric lamps 57 which could be employed to illuminate the window 22 and the drum 23. A live conductor 58 leads through a manual on-and-off switch 59, through a mercury tilt switch 60 to the lamps 57 and through a thermo-time-delay switch 61 to the solenoid 47. The tilt-switch can be actuated in any desired manner such as by placing it in the path of travel of the slider tab 29 so that rearward movement of the rack 28 will tilt the switch to the closed position and forward movement will tilt it to the open position.

To preset the device for a month of weight information, a chart is placed on the drum. The resetting button 43 is pushed forwardly against the bias of the spring 75 to force the threaded half-nut 39 away from the threads of the threaded shaft. The pointer blade 38 can now be freely slid to the left to position the pressure point in line with the first date column on the chart after which the button 43 is released to reengage the half-nut 39 with the threaded shaft so that the pointer blade will slowly travel to the right.

Each day the user will stand upon the treadle plate 13 to rotate the drum and close the tilt switch 60. After a sufficient interval, to allow the drum to come to rest, the time delay switch 61 will close the circuit to the solenoid 47 to rotate the spline 46 upwardly against the rear extremity of the blade to cause the pressure point 37 to mark the chart with the user's weight upon a given day. The above procedure is repeated each day giving a complete monthly record of the daily weights.

As above described, the device is automatically and electrically operated. A more economical manual-operated device employing the same drum and chart mechanism is illustrated in FIG. 7. In this form, the threaded shaft is replaced by a fixed forward slide rod 62 and the rotatable spline shaft 44 is replaced by a fixed rear slide rod 63. A slidable pointer carriage 64 is mounted on and is slidable along the rods 62 and 63.

A spring steel blade 65 is mounted, as indicated at 66, on the carriage 64 and extends forwardly terminating in a marking point 67 over the chart on the drum. The rear extremity of the pointer blade terminates in a finger tab 68 exteriorly of the drum compartment. The latter rear extremity is connected by a connecting rod 70 to a piston 69 riding in a dash pot 71 carried by the carriage 64. The dash pot has an outlet check valve 72 in its bottom and an intake port 73 part way up its side wall.

The user stands upon the scale treadle and presses the tab 68 downwardly to force the air from the dash pot 71 through the valve 72. He then stands still as the piston 70 slowly rises in the dash pot. When the piston passes the intake port 73, the air will rush into the dash pot allowing the rear extremity of the resilient pointer blade 65 to snap upwardly. The reaction of the upward snap of the rear portion causes the marking point 67 to snap downwardly to mark the chart as in the previously described form.

While a specific form of the invention has been described and illustrated herein, it is to be understood that the same may be varied, within the scope of the appended claims, without departing from the spirit of the invention.

Having thus described the invention, what is claimed and desired to be secured by Letters Patent is:

1. A scale for charting the weight of a person comprising: a rotatable chart-carrying drum; a record chart surrounding said drum; a depressible person-supporting treadle plate; means for converting vertical movement of said plate into rotative movement of said drum; a threaded shaft positioned adjacent and parallel to said drum; a second shaft positioned parallel to said threaded shaft; a carriage member slidable along said second shaft and engaging the threads of said threaded shaft; a pointer blade mounted on said carriage and extending and carrying a marking element over said chart; means for rotating said threaded shaft to cause said carriage and hence said marking element to travel axially of said drum; and means for actuating said pointer blade to cause said marker to engage and mark said chart.

2. A scale for charting the weight of a person as described in claim 1 in which the means for actuating said pointer blade functions in consequence of depression of said treadle plate.

3. A scale for charting the weight of a person as described in claim 1 in which the means for actuating said pointer blade comprises an eccentric protuberance extending longitudinally of said second shaft positioned so that when said second shaft is rotated, the protuberance will engage said pointer blade to cause said marker to engage said drum, and means for rotating said second shaft in consequence of a weight being applied to said treadle plate.

4. A scale for charting the weight of a person as described in claim 1 having means for disengaging said carriage member from the threads of said threaded shaft to allow said carriage member to be manually shifted along said second shaft.

5. A scale for charting the weight of a person as described in claim 3 in which the means for rotating said second shaft comprises an electric solenoid having a plunger connected eccentrically of said second shaft.

6. A scale for charting the weight of a person as described in claim 5 having switch means actuated by depression of said treadle plate for closing a circuit including said solenoid.

7. A scale for charting the weight of a person as described in claim 6 having a delayed action switch included in said circuit for closing the latter a time interval after depression of said depression plate.

References Cited in the file of this patent

UNITED STATES PATENTS

| | | |
|---|---|---|
| 1,285,169 | Hess | Nov. 19, 1918 |
| 1,463,770 | Bates | July 31, 1923 |